(12) United States Patent
Westergard (10) Patent No.: US 6,173,982 B1
(45) Date of Patent: Jan. 16, 2001

(54) SELF ALIGNING CRANK ASSEMBLY AND METHOD

(76) Inventor: W. David Westergard, 3782 S. Suntree Pl., Boise, ID (US) 83706

(*) Notice: Under 35 U.S.C. 154(b), the term of this patent shall be extended for 0 days.

(21) Appl. No.: 09/136,269

(22) Filed: Aug. 19, 1998

(51) Int. Cl.7 ........................................... B62M 1/02
(52) U.S. Cl. ............................................... 280/261
(58) Field of Search .................... 280/250, 260, 280/261, 259; 474/77, 78, 101, 122, 155–157, 152, 160, 162

(56) References Cited

U.S. PATENT DOCUMENTS

| | | |
|---|---|---|
| 3,972,247 | 8/1976 | Armstrong . |
| 4,580,997 | 4/1986 | Browning et al. . |
| 5,152,720 | 10/1992 | Browning et al. . |
| 5,205,794 | 4/1993 | Browning . |
| 5,354,243 | * 10/1994 | Kriek .................................. 474/160 |
| 5,358,451 | 10/1994 | Lacombe et al. . |
| 5,494,307 | 2/1996 | Anderson . |

* cited by examiner

Primary Examiner—Christopher P. Schwartz
Assistant Examiner—C. T. Bartz (74) Attorney, Agent, or Firm—Gazdzinski & Associates (57) ABSTRACT

An improved cycle transmission comprising 1) a freewheel cluster rotatably coupled to the rear wheel of a bicycle and in axial alignment with the rear wheel axle; 2) a crank assembly having one or more laterally moveable chain rings rotatably coupled to a front section of the bicycle frame and in axial alignment with the pedal axle; and 3) a drive chain entrained around both the freewheel and chain ring. In a first embodiment, the crank assembly comprises a single chain ring which is laterally moveable with respect to the cycle frame. Lateral movement of the chain ring occurs in direct response to changes in the position of the drive chain on the freewheel cluster. The lateral movement of the chain ring allows the drive chain to maintain itself within a single plane relative to the chosen freewheel sprocket, thereby eliminating lateral bias. Accordingly, with no lateral bias, the entire grouping of freewheel sprockets can be accessed with the single chain ring, which eliminates the need for a chainwheel derailleur and complex shift patterns, and simplifies the operation of the transmission. A dual chain ring embodiment of the moveable crank assembly and transmission is further described. Additionally, a simplified method of operating the improved transmission of the present invention is disclosed.

24 Claims, 10 Drawing Sheets

SELF ALIGNING CRANK ASSEMBLY AND METHOD

BACKGROUND OF THE INVENTION

1. Field of the Invention

This invention relates to transmissions used typically in multi-wheeled cycles such as bicycles, and more particularly to mechanisms that allow for smooth shifting of such transmissions between gears of varying ratio.

2. Description of Related Technology

Multi-geared bicycle transmissions have been known for many years. Most bicycles achieve multiple gear ratios by utilizing an arrangement of sprockets on a front sprocket assembly, commonly called the chain ring or chainwheel, and a rear sprocket assembly, called the freewheel or cassette. Typically, the chainwheel comprises two to three sprockets of varying diameter. The freewheel assembly typically comprises five to seven sprockets, also of varying diameter, but each smaller than the diameter of the sprockets on the chainwheel. More recently, freewheels with as many as 9 sprockets have been introduced. A drive chain coupling the chainwheel and the freewheel make up the drive train. As the chain is coupled to different sprockets on both the chainwheel and freewheel assemblies, a different effective drive ratio of the transmission is obtained. Each combination of chainwheel/freewheel sprockets in use by the drive chain represents a different gear ratio, and a different gear. Obviously, the more sprockets on both the chainwheel and the freewheel, the greater the number of available gear ratios, and, consequently, the greater number of gears.

For almost as many years, manufacturers and cyclists alike have recognized the need for efficient, smooth shifting from one gear to another, all the while maintaining a positive drive connection during the shifting process. The standard front and rear derailleur, which comprise the shift mechanism of choice for the vast majority of multi-geared bicycles, forces the chain on a holding sprocket toward an adjacent or receiving sprocket until a tooth of the adjacent sprocket catches the chain. The drive chain thus becomes entrained around a different combination of front and/or rear sprockets. Because gears are defined by the ratio of the front holding sprocket to the rear sprocket, the shift from one holding sprocket to an adjacent sprocket of different diameter results in a different gear ratio on the drive chain.

Several systems for effecting such changes of gear ratio are present in the prior art. One such system involves mechanisms for indexing the shift control such that either a front or rear derailleur moves laterally (e.g., transverse or perpendicular to the rotational plane of the sprocket) in response to a predetermined amount of movement of a shift lever, thereby causing the drive chain to move laterally upward or downward among the sprockets in the free wheel cluster (or chainwheel). This type of mechanism is described, for example, in U.S. Pat. No. 3,972,247, "Bicycle Shift Mechanism".

A second prior art system involves a complex lateral displacement of the rear derailleur in relation to the sprockets in a freewheel cluster. In these types of solutions, the rear derailleur starts in a first position in which the drive chain is entrained around one of the cogs in a freewheel and around the wheels of the rear derailleur. Movement of the shift control forces a lateral movement of the rear derailleur to a second position such that the trailing portion of the drive chain that is entrained around the wheels in the rear derailleur becomes aligned with a separate sprocket in the freewheel cluster. This lateral movement, together with a change in the angular position of the rear derailleur with respect to the bicycle frame, forces the drive chain to "jump" from one freewheel sprocket to another.

One embodiment of the aforementioned system is shown in U.S. Pat. No. 5,358,451, "Devices Enabling Shifting of Gears on Bicycles" issued to Lacombe, et al. Lacombe teaches a means of assisting the lateral movement of the rear derailleur along an axle slidably engaged within a housing having multiple control teeth, each tooth being adapted to permit lateral movement corresponding to one shift in the free wheel cluster.

Another embodiment of this type of mechanism is disclosed in U.S. Pat. No. 5,152,720, "Bicycle Transmission" issued to Browning, et al.

However, the foregoing prior art systems fail to address two fundamental shortcomings of modem, multi-geared cycle transmissions; specifically, 1) the high degree of redundancy and overlap between the gears; and 2) the inability to shift gears under a heavy load. To appreciate the significance of these problems, it is necessary fully to understand the operation of the drive train.

The diameter, or size, of the chainwheel and the freewheel sprockets is measured by the number of "teeth" on the sprocket. Chainwheels typically include sprockets having from 36 to 53 teeth. Freewheels include sprockets having from 11 to 34 teeth. Thus, a typical maximum and minimum gear ratio for bicycle drive trains with these sizes of chainwheels and freewheels is 4.82 (e.g., 53/11) for a maximum, and 1.06 (36/34) for a minimum.

Bicycle gearing is typically measured in "gear inches". This concept is derived from early "high-wheeler" bicycles, the gearing for which was measured based on the diameter of their front wheel. A high-wheeler with a 50-inch wheel diameter was said to be geared at 50 gear inches. A bicycle with a 25 inch wheel diameter and a two-to-one gear ratio in the drive train achieves the same forward motion with each pedal revolution as does the 50-inch high-wheeler, and thus is also said to be geared at 50 gear inches. Gear inches are computed by multiplying the drive wheel diameter by the effective gear ratio on the drive train. Using the maximum and minimum drive train gear ratios set out above, and using the normal diameter of a bicycle wheel (27 inches), the minimum gear inches would be approximately 28.6, and the maximum gear inches would be 130.1.

Experienced cyclists are well aware of the significance of gear inches. The greater the number of gear inches (i.e., the "taller" the gear), the more difficult the pedaling due to lower mechanical advantage. Conversely, the lower the number of gear inches (i.e., the "shorter" the gear), the easier it is to pedal. Depending on the gradient of the terrain (and the direction of the cyclist's travel with respect to the gradient), selecting the appropriate gear is not an insignificant task. Pushing a tall gear on the order of 130 inches would be quite difficult going up hills or even on flat terrain, and is consequently usually reserved for pedaling at high rates of speed down steep hills. Pushing a short gear of 28 inches (the so-called "granny" gear) is much easier and is useful in going up steep inclines while carrying baggage on the bicycle. Between these two extremes, there is a virtual continuum wherein a wide selection of gearing is possible. Gear inches of between 30 and 60 are likely adequate to accommodate most hills, reserving the shorter gears for the steeper hills. Gear inches between 60 and 90 are appropriate for travel on level ground, with the taller gears reserved for fast pedaling at high speeds. Gear inches above 90 are appropriate primarily for traveling down hills.

While the frequency and magnitude of gear changes varies in accordance with both the terrain and the degree of rider fitness, most riders prefer a gear change if their pedaling speed, or cadence, increases or decreases by more than ten percent. Gears spaced apart by seven to ten gear inches allow the rider to adjust the gearing up or down, and still maintain a cadence within the desired ten percent variance. Gears spaced closer than seven gear inches produce such a minimal impact on pedaling efficiency that most riders will not notice the difference between adjacent gears. Gears spaced further apart than ten inches will create a larger jump than is comfortable.

To achieve an optimum overall gear range and to provide adequate gear spacing, a common practice in recent years has been to include as many gears as possible on the bicycle in order to accommodate the widest range of terrain. Road bikes (and racing bikes) often have two-ring chainwheels sized at 42 and 53 teeth, and a 8-cog freewheel ranging in size from 13 to 24 teeth. This arrangement will result in the shortest gear being approximately 47 inches, and the tallest gear being 110 inches. Off-road bikes, or mountain bikes, usually have three-ring chainwheels with a typical sizing of 28, 42, and 52 teeth, and a 7-cog freewheel ranging in size from 13 to 34 teeth. This arrangement will result in the shortest gear being approximately 22 inches, and the tallest gear being 108 inches. Obviously, many different combinations are possible, but the foregoing examples are typical.

Because substantial overlap exists in the effective gear ratios of the aforementioned exemplary systems, a sequential "stepping up" through the gears from the shortest gear to the tallest gear is not a simple matter of starting at the shortest gear (achieved by entraining the drive chain around the smallest chainwheel and largest freewheel—42/24 or 47.2 gear inches) and progressing sequentially through the remaining freewheel cogs, and then shifting the drive chain to the larger chainwheel and starting anew at the largest freewheel. Rather, a back and forth shifting between the chainwheels and the freewheels is required, resulting in complicated shift patterns. The shift pattern varies in accordance with the particular type of gearing arrangement.

One such prior art shift pattern is known as the "half-step" gearing. Half-step gearing starts with a freewheel cluster having sprockets spaced at even distances apart. An example of this spacing would be a freewheel selection wherein each successively larger sprocket on the freewheel is about sixteen percent larger than the next closest smaller sprocket. Assuming a five cog freewheel for purposes of illustration, the resulting freewheel would have the following sprockets: 14, 17, 20, 24, and 28 teeth. The half-step approach then selects two chainwheel sprockets that are half as far apart as the sprockets on the freewheel-in this example the spacing would be eight percent. (i.e., 48 and 52 teeth). With this arrangement, the front derailleur shift is half the rear derailleur shift, and results in well spaced and useable effective gear ratios. However, the shift pattern to accomplish a sequential stepping up through the gears in this example is as follows: 48/28; 52/28; 48/24; 52/24; 48/20; 52/20; 48/17; 52/17; 48/14; and 52/14. As can be seen, the half-step pattern requires the rider to shift both the front and rear derailleurs simultaneously to reach four of the ten available gears. Remembering such a shift pattern is a difficult task, and effectuating such shifts consumes more of the rider's attention and time.

Another prior art shift pattern is the so-called "Alpine" pattern which is available on most bikes. The Alpine pattern is essentially the same as the half-step, but uses one and one-half steps. The freewheel spacing of sixteen percent remains the same, but the chainwheel sprockets are selected to be one and one-half times that spacing, or twenty-four percent. This results in two chainwheels of 40 and 52. The Alpine shift pattern suffers from even greater disadvantages than the half-step arrangement, in that 1) simultaneous shifting of both the front and rear derailleurs is necessary for seven of the ten gears; and 2) a large jump exists between the tallest and next-to-tallest gears. Furthermore, the Alpine arrangement involves an more challenging shift pattern, as follows: 40/28; 40/24; 52/28; 40/20; 52/24; 40/17; 52/20; 40/14; 52/17; and 52/14.

A third prior art shift pattern is known as the "crossover". In the crossover arrangement, the freewheel cluster is divided into a first group of closely spaced large freewheel cogs for hill climbing, and a second group of closely spaced small cogs for the flats. Crossover uses the smallest chainwheel in combination with the largest freewheel cogs for hill climbing, then crosses over to the larger chainwheel which is used in combination with the smallest freewheel cogs for the flats and downhills. Small gear steps are used for the flats and larger steps are used for the hills. While this arrangement allows for some gears for hills and some for flats, the division results in fewer gears than would be available with other patterns.

A fourth prior art shift pattern is known as the "wide-step" and is closely related to crossover. Wide-step uses a comparatively large chainwheel step (e.g., 36 to 53) and closely spaced freewheel steps. This permits a low range of gears for hill climbing and a higher range for the flats and downhill. To step up through the gears, a rider would utilize all the gears available with the small chainwheel sprocket, and then switch to the large chainwheel sprocket and repeat use of half of the freewheel sprockets. Effectively, the wide-step pattern creates a bicycle with two independent gear ranges. However, the larger freewheel cogs are not utilized with the larger chain ring.

Regardless of the shift pattern used, one consequence of the multiple chainwheels and freewheels is a high degree of redundancy in the gearing. The chart below illustrates the gear inches that can be achieved by the exemplary prior art road bike previously described. Bicycle A is a 12 speed bicycle which achieves gears of 49.3 inches on the short end, and 110 inches on the tall end. However, two of the twelve gears are within two gears inches of two separate gears, and two other gears are within four gear inches of yet two different gears. Bicycle B is a 16 speed bicycle which achieves a short gear of 47.2 gear inches and a tall gear of 110 gear inches. As was the case with Bicycle A, several of these gears are redundant-four of the gears are spaced within two gears inches of four separate gears. Two other gears are spaced within four gear inches of two separate gears. Thus, while Bicycle A, and Bicycle B have 12 and 16 separate gears, respectively, the practicality of the gear spacing renders four of the gears for Bicycle A, and six of the gears for Bicycle B, redundant of other gears. The end result is an 8-speed Bicycle (Bicycle A) and a 10-speed Bicycle (Bicycle B). [It should be noted that many different chainwheel/freewheel sizes and combinations are possible and result in different levels of redundancy and gear spacing. The following charts simply illustrate two common arrangements.]

| Bicycle A | | | Bicycle B | | |
| --- | --- | --- | --- | --- | --- |
| | 42 | 53 | | 42 | 53 |
| 13 | 87.2 | 110 | 13 | 87.2 | 110 |
| 15 | 75.6 | 95.4 | 14 | 81.0 | 102.2 |
| 17 | 66.7 | 84.1 | 15 | 75.6 | 95.4 |
| 19 | 59.6 | 75.3 | 16 | 70.8 | 89.4 |
| 21 | 54.0 | 68.1 | 17 | 66.7 | 84.1 |
| 23 | 49.3 | 62.2 | 19 | 59.6 | 75.3 |
| | | | 21 | 54.0 | 68.1 |
| | | | 24 | 47.2 | 59.6 |

Most manufactures recognize the redundancy in gear ratios, but deem such redundancy necessary to achieve a sufficient number of tall and short gears to meet the expected riding conditions of a typical cyclist.

In addition to gear redundancy, a second factor operates to limit the effective gearing of multi-speed bicycles. A study of the table for Bicycle B presented above shows that the rider could utilize all of the gears in the drive chain comprising the 42 chainwheel and the freewheel cluster to achieve a sequential stepping up through the gears. Crossover to the large chainwheel would not be necessary until after the rider had utilized 42/13 and achieved 87.2 gear inches, at which point, the rider would simultaneously shift both the front and rear derailleurs to 53/15 or 95.4 gear inches and finish stepping up to 53/13.

A smooth transition during the sequential stepping through the gears is not as natural as it would appear. As can be immediately understood by a physical inspection of an ordinary multi-speed bicycle derailleur system, the smaller chainwheel (the 42 chainwheel in the case of Bicycle B above) is positioned on the inside of the larger chainwheel. This positioning aligns the small chainwheel with the inside portion of the freewheel cluster, usually comprising the largest three or four cogs on the freewheel. Accordingly, the small chainwheel is not directly aligned with the outside, smaller cogs on the freewheel cluster. In fact, when the drive chain is entrained around the small (inner) chainwheel and the smaller, outer freewheel clusters, there is a significant lateral or transverse bias present in the drive chain. Referring again to Bicycle B as an example, when the drive chain is entrained around the 42/13, 42/14 and 42/15 gear combinations, the portion of the drive chain which is engaged by the chainwheel is closer to center of the bicycle frame than the portion of the drive chain which is engaged by the freewheel. The resulting lateral bias places undue stress on the chain, reduces pedaling efficiency (due to the force necessary to overcome the additional friction created by the lateral bias), and renders shifting out of one of these gears an often difficult task, particularly when climbing hills, accelerating to high speeds or other situations when the drive chain is under a high load. To avoid the lateral bias in the case of Bicycle B, the rider would need to shift off the small chainwheel after the 42/16 gear and proceed to 53/19. This maneuver would require a simultaneous shifting of both the front and rear derailleurs and would render virtually useless three of the gears—42/13, 42/14 and 42/15.

The same circumstance exists with respect to the large, outside chainwheel and the large, inside cogs on the freewheel. Again using the case of Bicycle B as an example, the gearing represented by 53/19, 53/21 and 53/24 places the drive chain in a lateral bias position in the opposite direction as the previous example (e.g., the freewheel portion of the chain is closer to the lateral frame center than the portion engaging the chainwheel). The difficulty of shifting under load is equally prevalent and, again, three additional gears are virtually useless—53/19, 53/21 and 53/24.

The aforementioned lateral bias problem is another practical reason why many multi-speed bicycles cannot utilize their full range of gearing.

The dual problems of redundancy and lateral bias defy a synergistic solution. Any attempt to solve the redundancy problem using standard components would require resort to a large jump between the sizes of the small and large chainwheels so that the gears could indeed step through short to tall gears by running sequentially through the entire freewheel cluster within each chainwheel. However, this attempted solution merely exacerbates the lateral bias problem by necessitating use of the inside/outside-outside/inside chainwheel/freewheel misalignment. Alternatively, focusing instead on avoiding the lateral bias problem by ignoring the gears where lateral bias is most prevalent requires greater redundancy to achieve an adequate spacing between gears. The net result is that multi-speed bicycles do not effectively utilize their full complement of gears due to high levels of redundancy, and cannot efficiently utilize their full complement of gears due to lateral bias.

Hence, an improved cycle transmission and method of operation are needed which overcome the above-identified disabilities associated with gear ratio redundancy and lateral bias. Such a transmission would also ideally be sized to fit on existing cycle frames and be comparable in weight and size to existing systems.

SUMMARY OF THE INVENTION

The present invention satisfies the aforementioned needs by providing a lightweight cycle transmission and gearing mechanism that achieves full utilization of each gear with little or no redundancy between the various gears, and eliminates lateral bias in the drive train.

In a first aspect of the invention, an improved cycle transmission is disclosed which comprises 1) a freewheel cluster rotatably coupled to the rear wheel of a bicycle in axial alignment with the rear wheel axle; 2) a crank assembly with associated chainwheel rotatably coupled to a front section of the bicycle frame and in axial alignment with the pedal axle; and 3) a drive chain entrained around both the freewheel cluster and chainwheel. In a first embodiment, the chainwheel comprises a single sprocket (chain ring), wherein the outer perimeter of the chainwheel sprocket has teeth which engage the drive chain and provide the positive connection for the drive train. The outer perimeter of the chainwheel is designed so as to allow for lateral movement of the chainwheel in direct response to the positioning of the drive chain on the freewheel cluster. If the drive chain is entrained around the inner, larger sprockets on the freewheel cluster, the outer perimeter of the chainwheel shifts laterally inward toward the frame of the bicycle. Conversely, if the drive chain is entrained around the outer, smaller sprockets on the freewheel cluster, the outer perimeter of the chainwheel shifts laterally outwardly away from the bicycle frame. The lateral shifting of the chainwheel perimeter allows the drive chain to maintain itself within a single plane relative to the chosen freewheel sprocket, "floating" from right to left or left to right in response to the position of the drive chain on the freewheel cluster, thereby eliminating lateral bias. Accordingly, with no front (chainwheel) derailleur or lateral bias, the entire grouping of freewheel sprockets can be used with the single sprocket chainwheel, which eliminates complex shift patterns and simplifies operation of the transmission. The simplified transmission of the present invention can further be easily retrofitted in place of the standard chainwheel in use on the installed base of multi-geared bicycles.

In another embodiment of the cycle transmission of the present invention, a laterally moveable or floating chainwheel assembly having a plurality of sprockets of varying diameter is disclosed. Different overall ratios are achieved through the use of different chainwheel/freewheel sprocket combinations in conjunction with a front derailleur modified for use with the moveable chainwheel.

In a second aspect of the invention, an improved bicycle utilizing the aforementioned transmission and gearing mechanism (both single and multiple sprocket embodiments) is disclosed. Wheels having a diameter which optimize the performance of the bicycle in the intended application based on the chosen gearing arrangement are further utilized.

In a third aspect of the invention, a method for operating the improved cycle transmission of the present invention is disclosed. Using the single chainwheel sprocket embodiment, increasing gear ratios are chosen by shifting the rear derailleur in sequential fashion starting with the largest diameter freewheel sprocket and continuing through to the smallest. Furthermore, the combined effects of gear spacing and elimination of lateral bias permit shifting the rear derailleur in a non-sequential fashion and under all conditions of load. Using the two chainwheel sprocket embodiment, increasing gear ratios are chosen by shifting the rear derailleur in the same sequential fashion as for the single chainwheel embodiment while starting off with the smaller diameter chainwheel sprocket. When the effective ratio of the small chainwheel sprocket and smaller freewheel sprocket is approximately 5–7 gear inches less than the effective ratio of the larger chainwheel sprocket combined with a larger freewheel sprocket, the forward derailleur is shifted to the larger sprocket.

DETAILED DESCRIPTION OF THE INVENTION

Reference is now made to the drawings wherein like numerals refer to like parts throughout.

Figure 1:
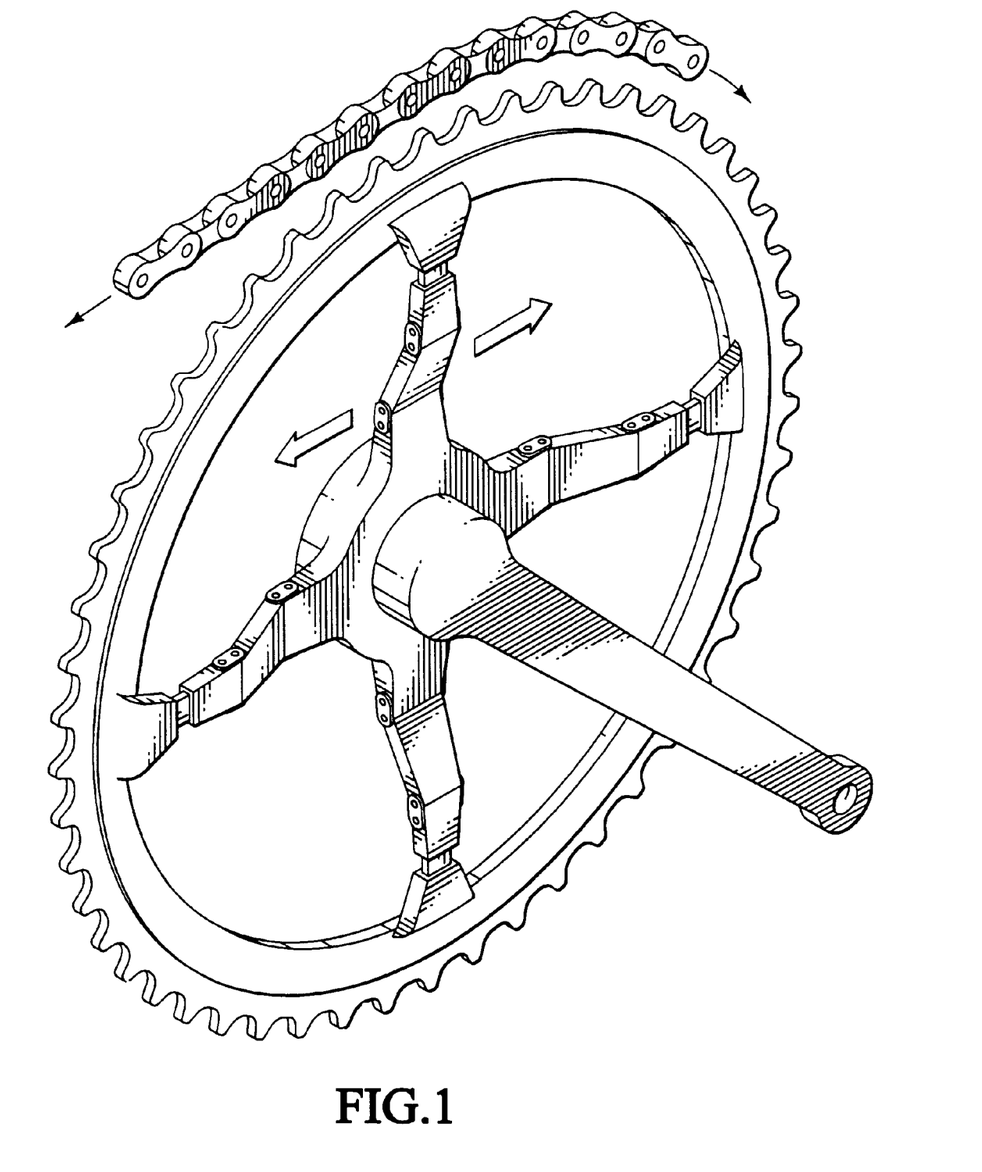
FIG. 1 is an enlarged perspective view of a first embodiment of a crank assembly according to the present invention, having a single chainwheel sprocket.
Figure 2:
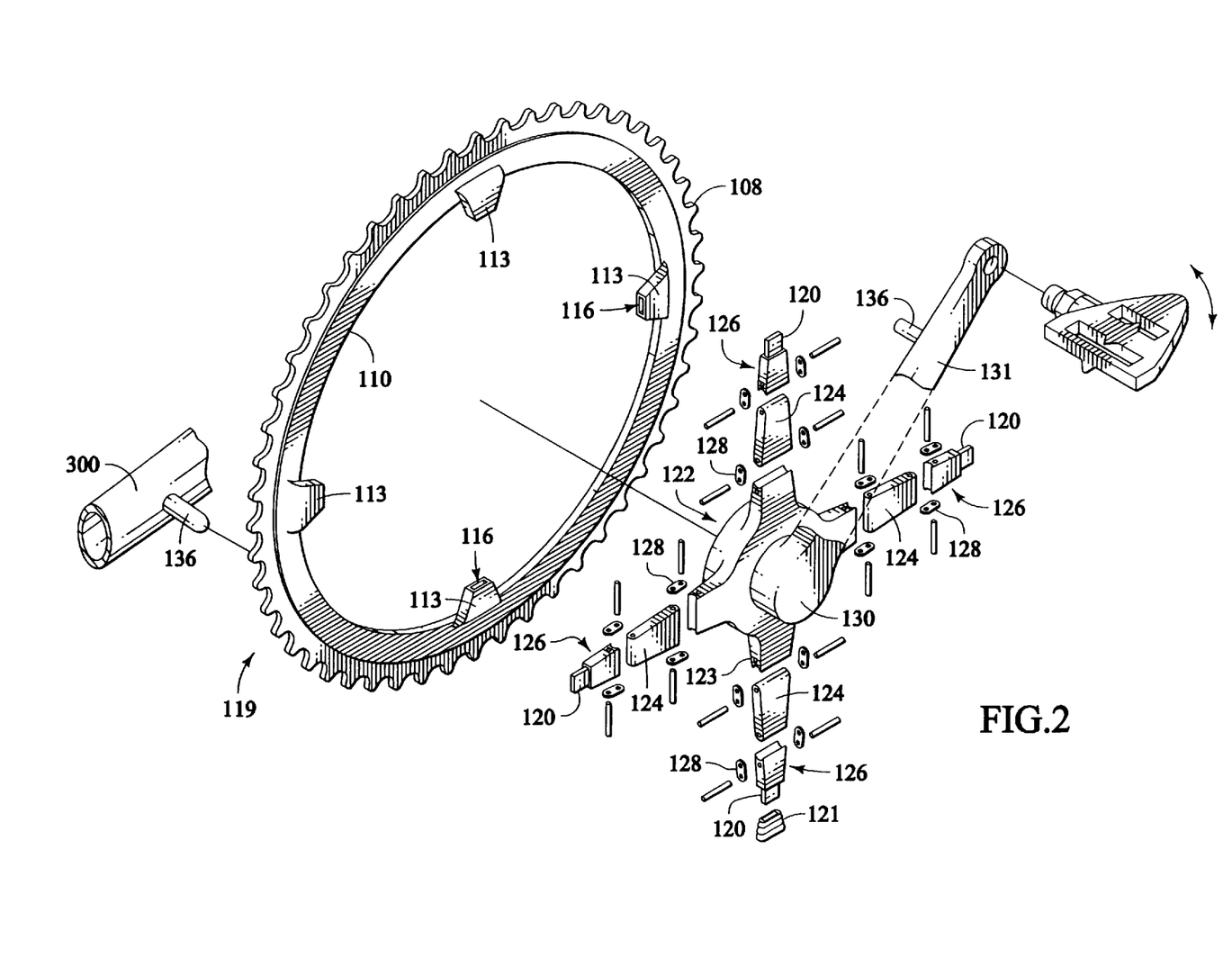
FIG. 2 is an exploded perspective view of the components of the crank assembly of FIG. 1, including pedal crank.
Figure 3:
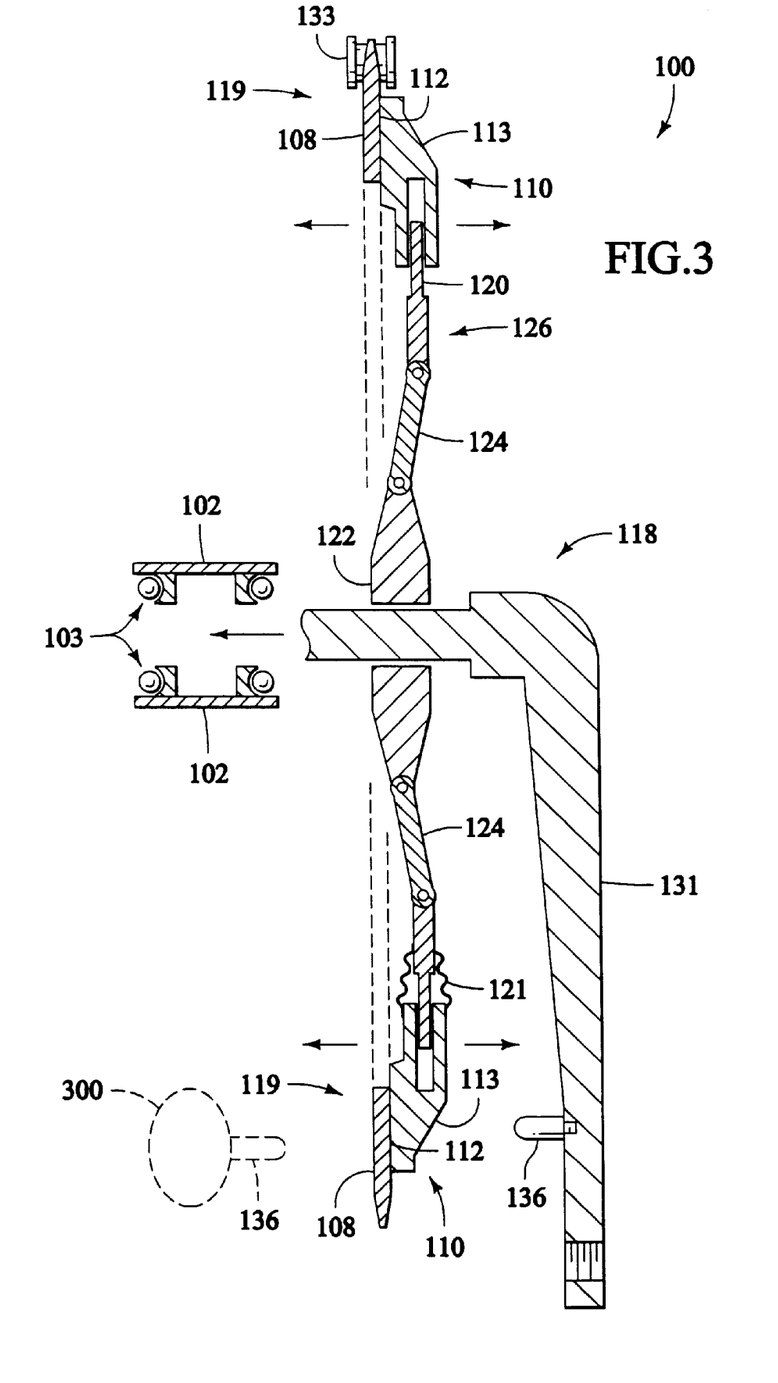
FIG. 3 is a top cross-sectional view of the crank assembly of FIG. 2.

Referring now to FIGS. 1–3, a first embodiment of the crank assembly according to the present invention is described. The chainwheel or crank assembly 100 is rotatably mounted within the cycle frame 102 using ball bearing and race assemblies 103 associated with bottom brackets of the type well known in the art, or alternatively roller or other low-friction bearings. The crank assembly 100 is generally composed of an articulated, spoked inner portion 118 and outer portion 119. The outer portion 119 includes a perimeter or chain ring 110, the outermost portion of which includes teeth in the form of a sprocket 108 for entraining a drive chain. Note that in the present embodiment, the perimeter ring and sprocket are of metallic construction, although other materials with desirable mechanical properties (such as reinforced composites) may be used. The chainwheel sprocket (chain ring) 108 is ideally integral with or formed as part of the outer perimeter ring 110. Alternatively, the sprocket 108 may be a separate component which is mounted to the perimeter ring 110 using a series of welds or other fasteners. The aforementioned unitary perimeter ring and chain ring are preferred, however, for purposes of strength, rigidity, and reduced weight.

The perimeter ring 110 further includes a plurality of lands 113 having a slotted recess 114 formed therein. The recesses 114 are oriented with their open end 116 pointing radially inward toward the center of the perimeter ring 110 so as to slidably receive the corresponding tongue portion 120 of the outer spoke elements 126 as described in greater detail below.

The articulated, spoked inner portion 118 of the crank assembly 100 includes a central hub element 122 having a series of inner spoke elements 123, a plurality of intermediate spoke elements 124, and a plurality of outer spoke elements 126 as shown in FIGS. 1 through 3. The inner and outer spoke elements 123, 126 are mated to the intermediate elements 124 via a pin and hinge arrangement 128 of the type well known in the mechanical arts, although it can be appreciated that a variety of different mechanical joints (such as ball or Heim joints) may be used to provide the desired functionality. The tongue portions 120 are rigidly mounted on their respective outer spoke elements 126 and sized so as to slidably engage the recesses 114. In this fashion, the perimeter ring 110 and sprocket 108 is articulated and can move laterally with respect to the inner, intermediate, and outer spoke elements 123,124,126 while maintaining a mechanical linkage thereto as shown in FIGS. 1 and 3. This mechanical linkage permits the transfer of torque from the inner spoke and central hub elements (which are connected to the crank arm 131) directly to the perimeter ring and sprocket, and ultimately the drive chain and freewheel. Lateral movement of the perimeter ring 110 and chain ring 108 are induced by forces resulting from the movement of the drive chain 133 (via the rear derailleur, not shown) between various of the freewheel sprockets. Specifically, as the rear derailleur translates the drive chain to a new freewheel sprocket, a lateral bias is generated on the drive chain since the new freewheel sprocket is no longer coplanar with the chainwheel drive sprocket 108. This lateral bias is transmitted to the perimeter ring 110 and chain ring 108 as a lateral force. Accordingly, the intermediate and outer spoke elements 124, 126 of the chainwheel assembly will move in relation to one another (as well as to the perimeter ring 110 and the central hub 122) until the lateral force is effectively eliminated. Since the chainwheel assembly of FIGS. 1–3 is designed to minimize the lateral force necessary to effect movement of the perimeter ring 110 and chain ring 108 with respect to the central hub 122, even a very small lateral bias present on the drive chain 133 will realign the teeth of the sprocket 108 so as to be essentially coplanar with the teeth of the selected freewheel sprocket. Small lateral oscillations of the chain ring around the coplanar position may be experienced during subsequent operation; however, such oscillations are small in magnitude and self-correcting, especially when the transmission is under load. In any event, lateral oscillations of this magnitude would not be felt by the rider and would not interfere with torque transmission.

As with the perimeter ring 110 and sprocket 108 previously described, the inner chainwheel portion 118 components are ideally fashioned from lightweight metal alloy having sufficient strength for the anticipated mechanical loading imparted thereon, although other materials may be substituted and used in combination therein.

In the present embodiment, the tongue portions 120 and recesses 114 are further finely machined and matched so as to allow relative movement there between without undue oscillation or movement during transmission loading and unloading or gear shifting. These components are also lubricated using any suitable petroleum- or graphite-based lubricant (such as graphite powder for example) so as to further reduce friction. Expandable rubber or plastic dust caps 121 may also be added to prevent the ingress of foreign matter.

As shown in FIG. 2, a set of inner and outer stop pins 136 are located on the inboard side of the outer crank arm 131 and on the frame chainstay 300 coincident in radial alignment with the sprocket 108 to limit the lateral travel of the perimeter ring 110 and sprocket 108 in relation to the central hub 122 so that the tongue portions 120 of the outer spoke elements 126 will not disengage from their respective recesses 114. The lateral position of the stops pins 136 are adjusted so as to correspond to the lateral position of the smallest and largest freewheel sprockets such that when the drive chain 133 engages the smallest or largest freewheel sprocket and is coplanar therewith, the perimeter ring/sprocket assembly 110, 108 is in contact with the outer or inner stop pins 136, respectively. Since the stop pins 136 rotate with the chainwheel assembly 100 and sprocket 108, no frictional penalty exists when the perimeter ring/sprocket engages the inner or outer pins 136. To the contrary, the stop pins act to stabilize the sprocket 108 and perimeter ring 110 when the smallest or largest freewheel sprocket is engaged and the transmission is under load.

Figure 2A:
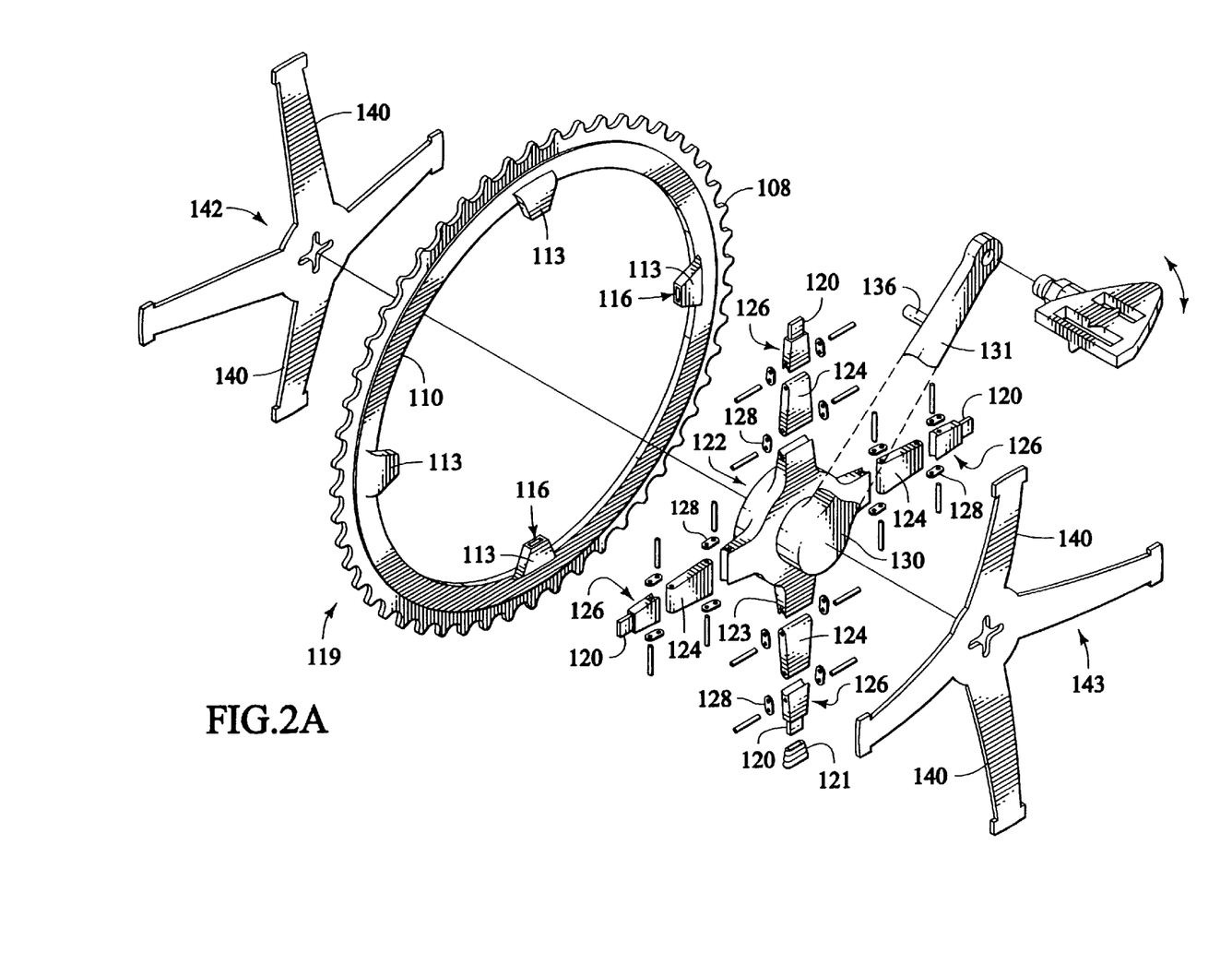
FIG. 2a is an exploded perspective view of the crank assembly of FIG. 1, including optional stop limit elements.

Despite the use of stop pins in the present embodiment, it can be readily appreciated that any number of different arrangements can be used to limit the lateral travel of the perimeter ring 110 and sprocket 108. For example, as shown in the alternate embodiment of FIG. 2a, a set of inner and outer stop limit arms 140 are optionally utilized. In the present embodiment, these stop limit arms 140 are comprised of a set of inner and outer rigid spoked stop limit elements 142, 143 mounted on each side of the chainwheel assembly 100. Alternatively, the aforementioned tongue portions 120 and associated recesses 114 may be made "T" shaped such that the tongue 120 can not fully retract from the recess as shown in FIG. 2b. Hence, the recess 114 and tongue 120 act to self-limit the lateral travel of the perimeter ring 110 and sprocket 108.

Figure 4A:
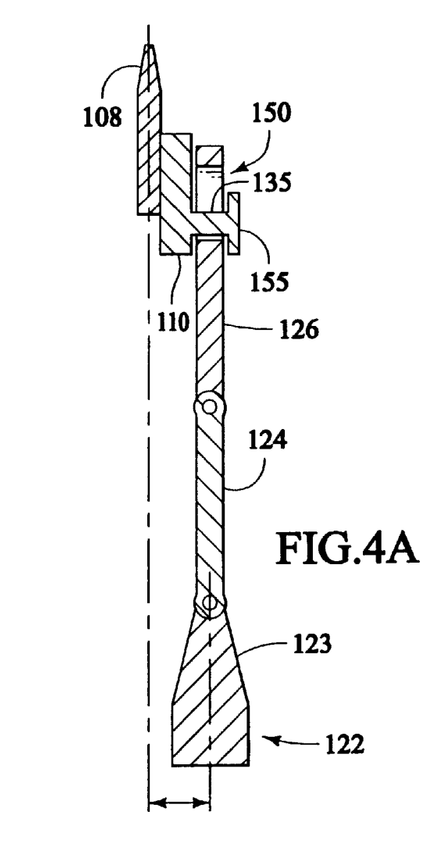
FIGS. 4a–4c illustrate a first alternative embodiment of the sliding spoke element and perimeter ring arrangement of the present invention, incorporating a slot and pin arrangement.
Figure 4B:
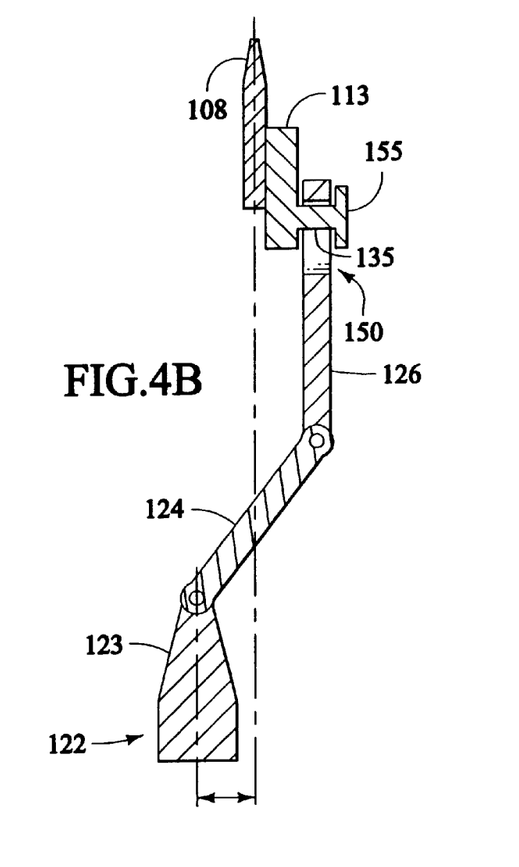
Figure 4C:
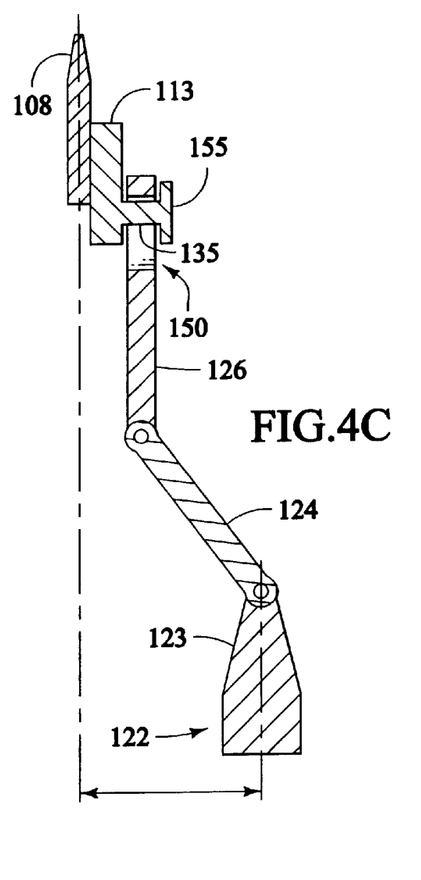

As an alternative to the tongue and recess system described with respect to FIG. 2 above, a slot and bolt arrangement such as that depicted in FIG. 4a may be used to implement the aforementioned lateral movement of the crank assembly of the present invention. In this embodiment, the perimeter ring lands 113 include respective slots 150 whose longitudinal axis is oriented in a generally radial direction with respect to the central hub 122. Each of the outer spoke elements 126 includes a rigidly mounted sliding pin 135 which fits within the respective slot 150 in the land 113 and retained therein by a retainer 155 attached to or integral with the sliding pin 135. The length and position of the slots 150 are ideally adjusted such that the sliding pin 135 engages the outer periphery of each slot 150 when the perimeter ring 110 is at the outermost or innermost limit of its lateral travel, as shown in FIGS. 4b and 4c respectively.

Figure 5A:
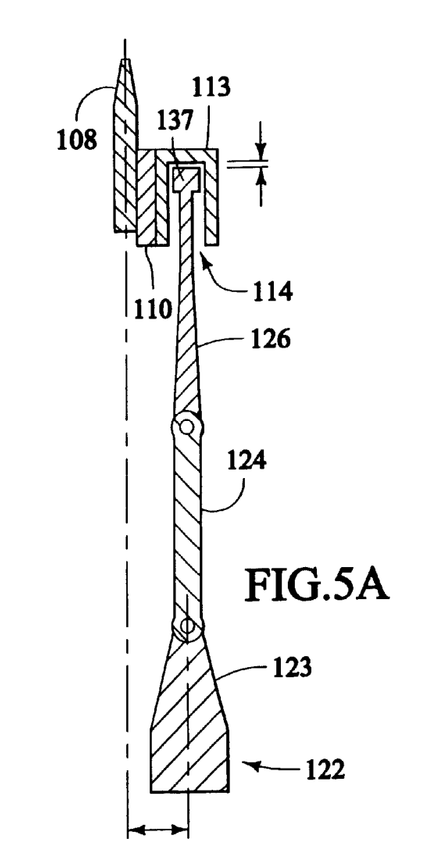
FIGS. 5a–5c illustrate a second alternative embodiment of the sliding spoke element and perimeter ring arrangement of the present invention, incorporating a piston and cylinder arrangement.
Figure 5B:
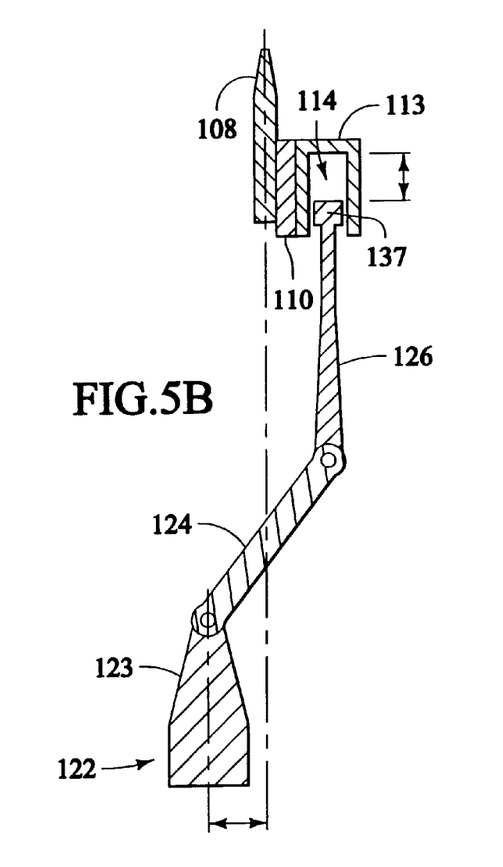
Figure 5C:
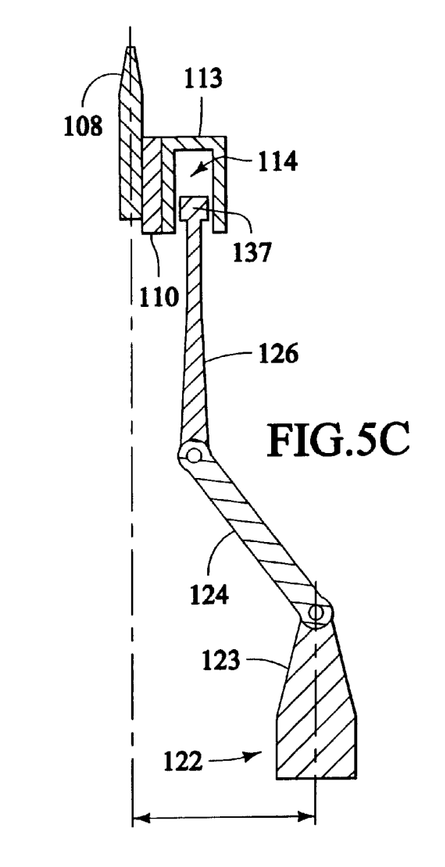

As yet another alternative to the tongue and recesses linkage system described above, a piston arrangement may be used to effect lateral movement of the perimeter ring and sprocket. As shown in FIGS. 5a–5c, the outer spoke elements 126 are each fitted with a piston 137 of circular cross-section which is matched to a cylindrically shaped recess 114 within the respective land 113 of the perimeter ring 110. As the perimeter ring and sprocket 110, 108 move laterally with respect to the central hub 122, each of the pistons moves inward or outward of its recess (depending on the direction of lateral travel). The intermediate and outer spoke elements 124, 126 also move in angular relationship to one another so as to maintain the piston 137 in angular alignment with the longitudinal axis of the cylindrical recess 114.

Figure 6:
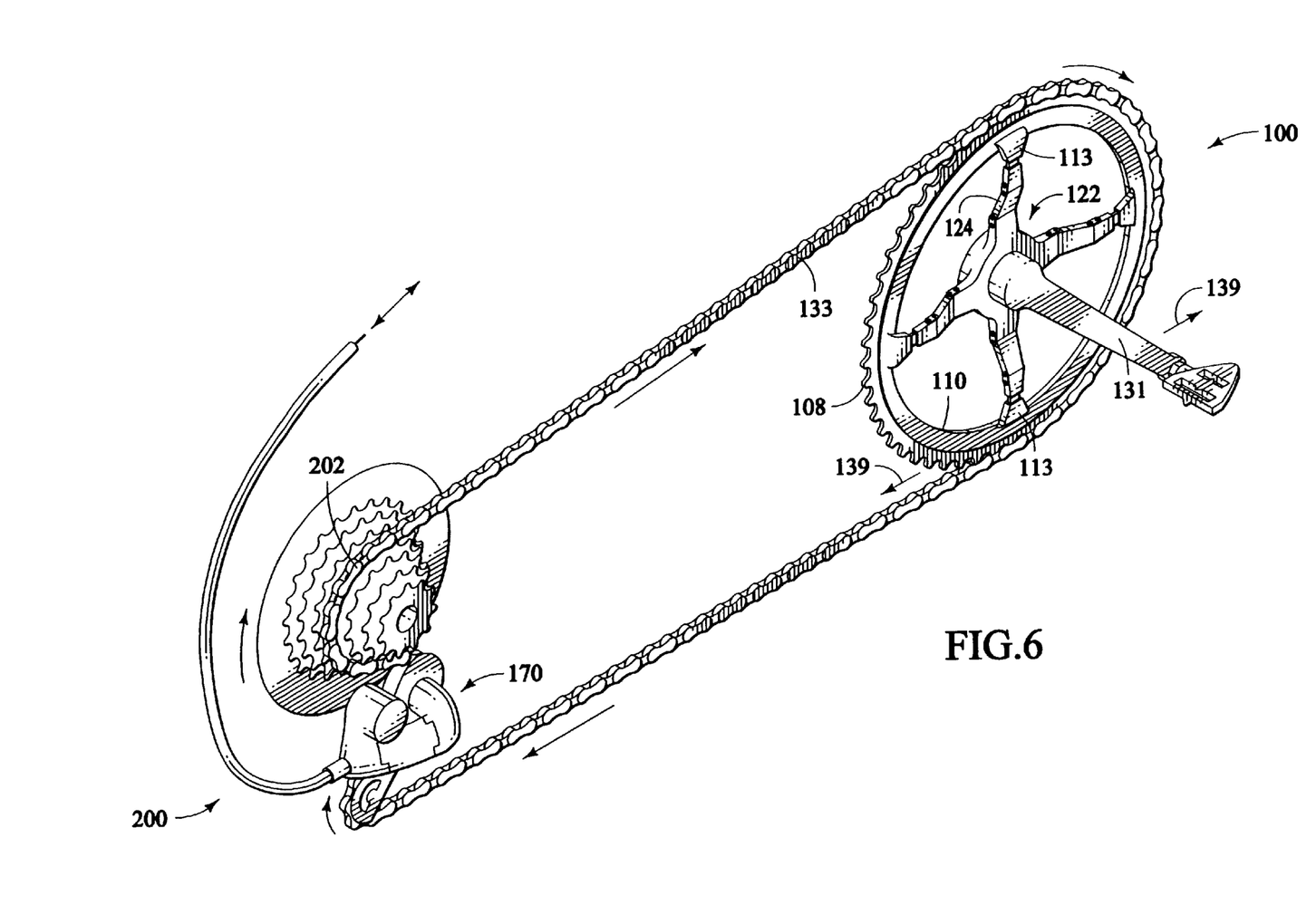
FIG. 6 is a perspective view of a cycle transmission according to the present invention, incorporating the chainwheel of FIG. 1.

Referring now to FIG. 6, a bicycle transmission incorporating the crank assembly of FIG. 1 is illustrated. It should be noted that while the following discussion is cast in terms of a bicycle, the crank assembly and transmission of the present invention can be applied to a number of different types of vehicles, including, without limitation, tricycles and quadcycles, or other chain or belt driven gearing systems.

Figure 7:
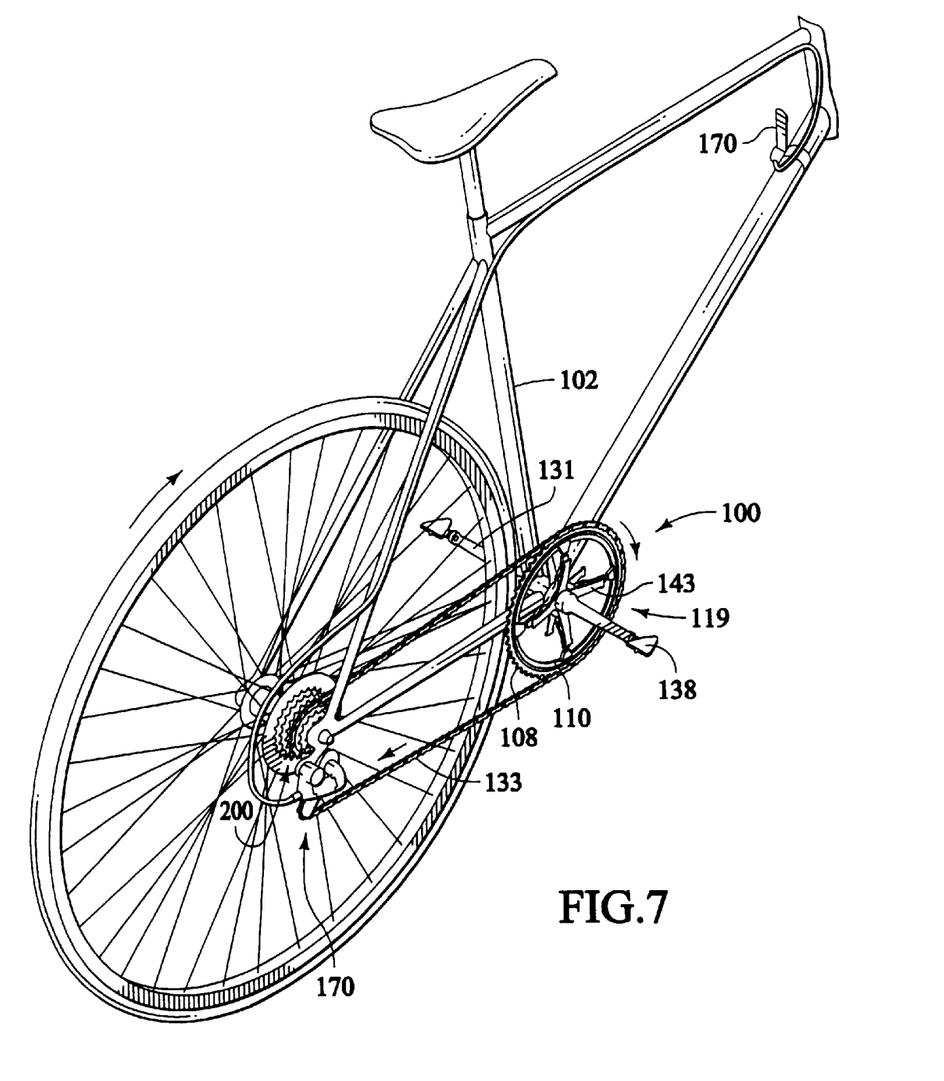
FIG. 7 is a perspective view of a bicycle having the transmission of FIG. 6.

As shown in FIG. 6, the transmission includes the chainwheel (crank) assembly 100, a freewheel assembly 200 rotatably mounted on the cycle frame (not shown), and a standard multi-link drive chain 133 engaging both the chainwheel sprocket 108 and the selected freewheel sprocket 202. Torque applied to the chainwheel central hub (via the pedals 138) is translated into tension on the drive chain 133 and ultimately torque on the freewheel assembly 200 via the teeth of the freewheel sprocket 202. As previously described, the chainwheel sprocket 108 and perimeter ring 110 move in a lateral direction 139 in response to forces resulting from movement of the drive chain 133 by the rear derailleur 170 onto various freewheel sprockets so as to effectively eliminate lateral bias. FIG. 7 further illustrates a bicycle outfitted with the crank assembly of FIG. 2.

The operation and advantages of the single sprocket chainwheel assembly and transmission described above are further illustrated by way of the following example. Assuming the transmission of the present invention to include a chainwheel sprocket size of 48, and a freewheel cluster having sprocket sizes of 12, 13, 14, 15, 17, 19, 21, 23, and 26, a total of nine different overall gear ratios ranging from approximately 50 gear inches (short) to 108 gear inches (tall) are available to the rider. In comparison, the typical prior art transmission having two chainwheel sprockets (assume sizes of 42 and 53) and seven freewheel sprockets of sizes including 13, 14, 15, 17, 19, 21, and 23. This prior art combination produces overall gear ratios ranging from approximately 49 gear inches to 110 gear inches. Since the present invention eliminates the sides bias for all freewheel sprockets normally present with the prior art transmission system, all nine freewheel sprockets are accessible, even under high load conditions, whereas all seven of the freewheel sprockets of the prior art system may not be accessible, especially under load. Hence, the rider of the cycle having the transmission of the present invention has essentially the same gear range available to him/her as the two-sprocket prior art systems, yet without having 1) a front derailleur, 2) complex shifting patterns necessary to avoid redundant gears, 3) increased friction due to lateral bias, and 4) inaccessibility of certain gears.

Figure 8:
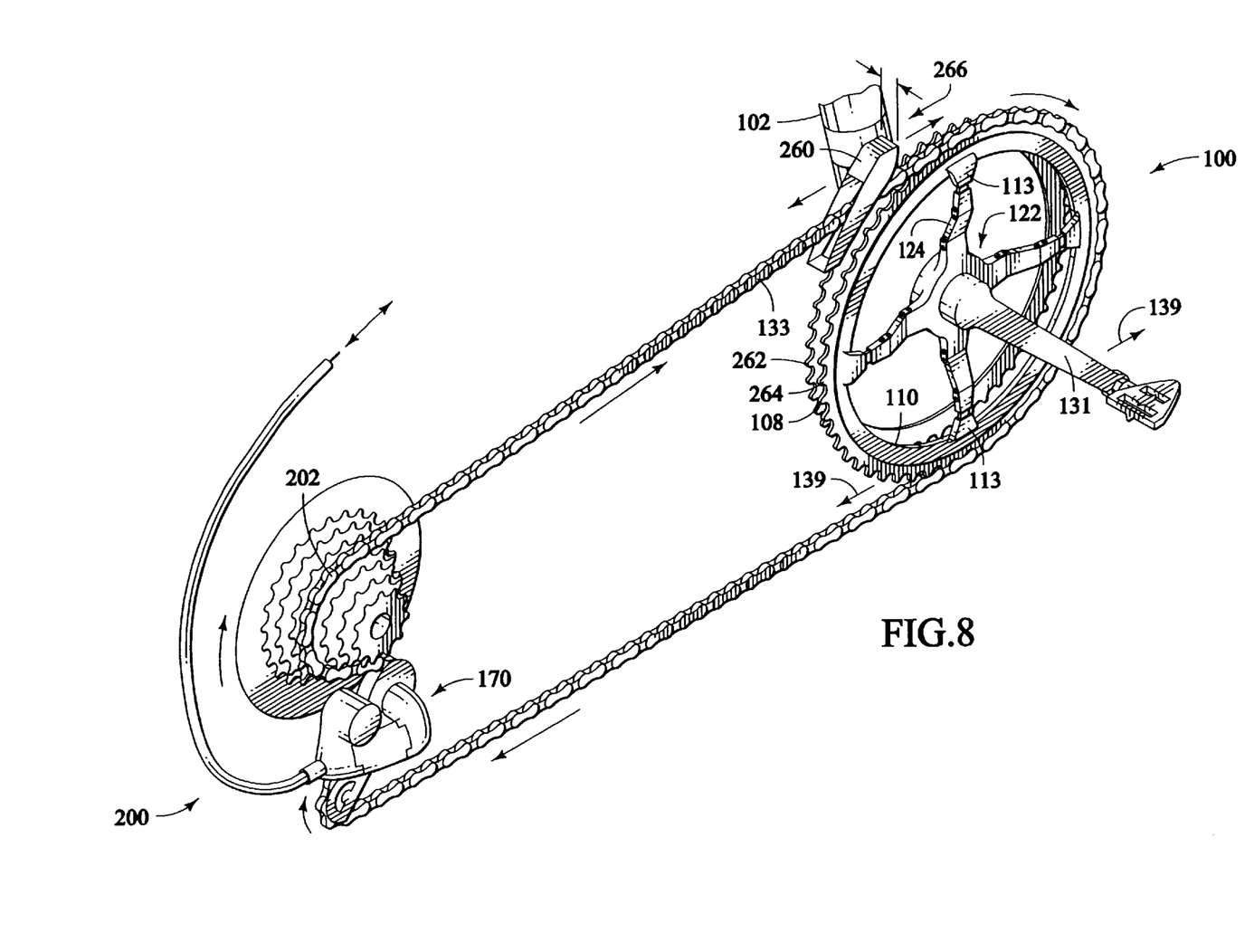
FIG. 8 is a perspective view of an alternate embodiment of the bicycle transmission of the present invention, incorporating a dual sprocket chainwheel.
Figure 8A:
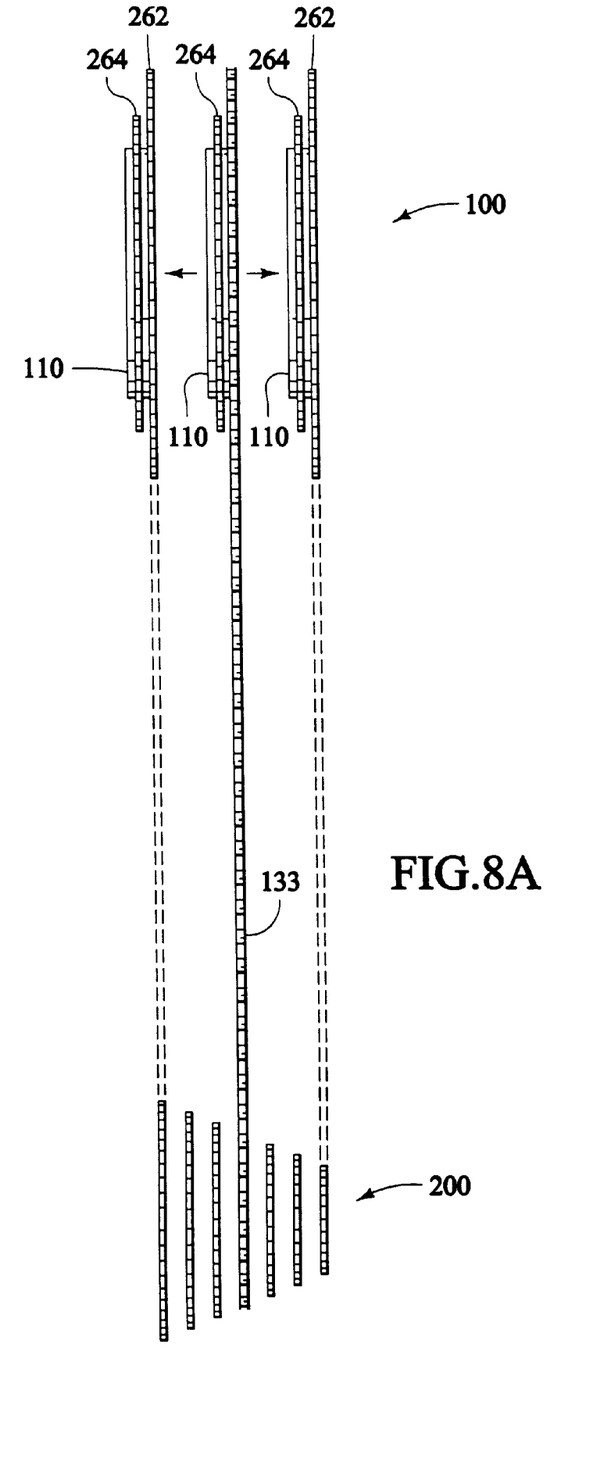
FIG. 8a is a top plan view of the bicycle transmission of FIG. 8, showing the lateral movement of the chainwheel in relation to the freewheel cluster assembly for various chainwheel/freewheel combinations.

Another embodiment of the transmission of the present invention is shown in FIGS. 8 and 8a. In this embodiment, a multi-sprocket chainwheel 250 is used in conjunction with a forward derailleur 260 to allow the same effective range of gear ratios with a lesser number of freewheel sprockets. As shown in FIG. 8, two chain rings 262, 264 of different diameter are integral with the chainwheel perimeter ring 110. The forward derailleur 260 is mounted to the bicycle frame 102, and is sized in the lateral dimension 266 so as to permit lateral travel of the chainwheel perimeter ring 110 through the entire range of freewheel sprocket motion without interference from the derailleur 260. Additionally, the front derailleur 260 can either be indexed (e.g., moves in specific, predetermined increments in response to each movement of the remotely mounted shift lever) in accordance with techniques well known in the art, or can be part of a friction shift system with shift levers on the drop tube, as was common years ago.

As shown in the top plan view of FIG. 8a, the two chain rings 262, 264 (and freewheels) of the transmission of FIG. 8 are alternately selected by the rider to accomplish the desired overall gear ratio. The perimeter ring 110 and chain rings 262, 264 move laterally with respect to the freewheel cluster assembly 200 so as to maintain alignment between the selected freewheel and the selected chain ring.

Method of Operation

A method of operating the improved cycle transmission of the present invention is now disclosed. Referring again to FIG. 7, the single chainwheel sprocket embodiment of the present invention is operated by moving the operating lever (or other operating mechanism) for the rear derailleur 170 so as to induce transfer of the drive chain 133 from one freewheel sprocket to another. In response to the lateral bias created upon this transfer (i.e., when the drive chain engages the sprocket being shifted to), the chainwheel perimeter ring 110 and sprocket 108 adjusts laterally so as to mitigate the bias. This lateral adjustment combined with the use of a single chainwheel sprocket 108 allows the rider to shift almost instantaneously between any two sprockets on the freewheel 200, even if 1) the freewheel sprockets being shifted from/to are not contiguous; and 2) the transmission is under heavy load. Furthermore, when increasing cycle speed on a level surface, no complex shift pattern is required (as with prior art systems) since the gear ratios resulting from each chainwheel/freewheel sprocket combination increase sequentially.

With respect to the double chainwheel sprocket embodiment of FIG. 8, shifting throughout the entire range of available gear ratios requires use of the front (chainwheel) derailleur 260 as well as the rear derailleur 170. However, unlike prior art systems using both front and rear derailleurs, the present invention allows the use of a broader range of chainwheel and freewheel sprocket sizes which largely eliminates the redundancy inherent in prior art transmission systems. This redundancy requires the use of one of the complex shift patterns described above. Since lateral bias is effectively eliminated under all chainwheel/freewheel sprocket combinations (and load conditions) in the present invention, sprocket sizes can be chosen such that the shift pattern is essentially sequential (i.e., utilizes the entire range of freewheel sprockets on a given chainwheel sprocket before changing chainwheel sprocket sizes). Accordingly, the method of shifting is, in the instance of up-shifting on a level surface, comprised of sequentially selecting the next taller (i.e., smaller diameter) freewheel sprocket until the tallest gear is reached, and then subsequently shifting through the freewheel sprockets again in sequential fashion (lowest to tallest) on the second (larger diameter) chainwheel sprocket. In the foregoing example using the 31 and 53 chainwheel sprockets and the 23 through 13 freewheel sprockets, only one gear (i.e., the 53/23) is redundant. Hence, using the above method, the rider may start with the second-lowest freewheel sprocket (i.e., 21) when utilizing the larger chainwheel sprocket in order to avoid the redundant gear.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A cycle crank assembly comprising:
   a central hub adapted to rotate about an axis and having at least two spokes;
   a chain ring having at least one sprocket associated therewith, said chain ring being moveably attached to said spokes such that said chain ring and sprocket are capable of being laterally translated in a direction parallel to said axis with respect to said central hub, the orientation of said chain ring with respect to said axis not changing during said lateral translation.

2. The crank assembly of claim 1, wherein said central hub is rotatably mounted to a bicycle frame.

3. The crank assembly of claim 1, wherein said spokes are articulated and include at least one hinged joint.

4. The crank assembly of claim 1, wherein said moveable attachment comprises a tongue and recess arrangement.

5. The crank assembly of claim 1, wherein said moveable attachment comprises a slidable pin and slot arrangement.

6. The crank assembly of claim 1, wherein said sprocket is welded to said chain ring.

7. The crank assembly of claim 1, wherein said chain ring and sprocket are at least partially metallic in composition.

8. A cycle transmission comprising:
   a crank assembly rotatably mounted on a cycle frame, said crank assembly having at least one chain ring, said chain ring being positioned in a parallel relation to a first plane and being moveable laterally with respect to said cycle frame, and wherein lateral movement of said chain ring occurs in a direction substantially perpendicular to said first plane;
   a freewheel cluster assembly having at least two freewheels, said freewheel cluster assembly being rotatably coupled to said cycle frame, the rotational plane of said freewheel cluster assembly being substantially parallel to the rotational plane of said crank assembly; and a drive chain coupling at least one of said freewheels to said at least one chain ring, whereby said drive chain transfers torque from said chain ring to said at least one freewheel, and whereby placement of the drive chain on said one of said freewheels maintains said chain ring in substantial lateral alignment with said at least one freewheel.

9. The cycle transmission of claim 8, wherein said crank assembly further comprises:

a central hub having at least two spokes;

a chain ring having at least one sprocket associated therewith, said chain ring being moveably attached to said spokes such that said chain ring and sprocket are laterally moveable with respect to said hub.

10. A bicycle comprising:

a frame;

a first wheel rotatably attached to said frame;

a second wheel rotatably attached to said frame in substantial alignment with said first wheel;

a transmission having:
  a crank assembly rotatably mounted on said frame, said crank assembly having at least one chain ring, said chain ring being positioned in a parallel relation to a first plane and being moveable laterally with respect to said frame, and wherein lateral movement of said chain ring occurs in a direction substantially perpendicular to said first plane;
  a freewheel cluster assembly having at least two freewheels, said freewheel cluster assembly being rotatably coupled to said frame, the rotational plane of said freewheel cluster assembly being substantially parallel to the rotational plane of said crank assembly; and
  a drive chain coupling at least one of said freewheels to said at least one chain ring, whereby said drive chain transfers torque from said chain ring to said at least one freewheel, and whereby placement of the drive chain on said one of said freewheels maintains said chain ring in substantial lateral alignment with said at least one freewheel.

11. The bicycle of claim 10, wherein said freewheels are coupled to the rearmost wheel and said crank assembly is rotatably mounted within said frame forward of said freewheel cluster assembly.

12. A method of operating a bicycle transmission having a crank assembly with at least one laterally moveable chain ring and a freewheel cluster having at least a first and second freewheel, said method comprising:

providing a drive chain coupling said at least one chain ring to said first freewheel;

providing a mechanism for shifting said drive chain between said at least first and second freewheels;

rotating said crank assembly and chain ring;

shifting said drive chain from said first freewheel to said second freewheel, wherein said shifting induces a lateral movement in said chain ring to bring said chain ring into substantial lateral alignment with said second freewheel.

13. The method of claim 12, wherein said crank further comprises:

a central hub having at least two articulated spokes;

a chain ring having at least one sprocket associated therewith, said chain ring being moveably attached to said spokes such that said chain ring and sprocket are laterally moveable with respect to said hub.

14. The method of claim 12, wherein said mechanism for shifting said drive train is a derailleur.

15. The method of claim 12, wherein said crank assembly includes two chain rings of differing diameter.

16. A cycle transmission comprising:

a crank assembly rotatably mounted on a cycle frame, said assembly having at least one chain ring, said chain ring being moveable laterally with respect to said cycle frame;

a cassette assembly having at least two freewheels, said cassette assembly being rotatably coupled to said cycle frame, the rotational plane of said cassette assembly being in substantial alignment with the rotational plane of said crank assembly; and a drive chain coupling at least one of said freewheels to said at least one chain ring, whereby said drive chain transfers torque from said chain ring to said at least one freewheel, and whereby placement of the drive chain on said one of said freewheels maintains said chain ring in substantial lateral alignment with said at least one freewheel.

17. A cycle crank assembly comprising:

a central hub having at least two spokes, said at least two spokes being articulated and including at least one hinged joint;

a chain ring having at least one sprocket associated therewith, said chain ring being moveably attached to said spokes such that said chain ring and sprocket are laterally moveable with respect to said hub.

18. The crank assembly of claim 17, wherein said sprocket is welded to said chain ring.

19. The crank assembly of claim 17, wherein said chain ring and sprocket are at least partially metallic in composition.

20. The crank assembly of claim 17, wherein said at least one hinged joint is spring loaded so as to induce said chain ring to return laterally to a first position when no force is applied thereto.

21. A cycle crank assembly comprising:

a central hub having at least two spokes;

a chain ring having at least one sprocket associated therewith, said chain ring being moveably attached using a tongue and recess arrangement to said spokes such that said chain ring and sprocket are laterally moveable with respect to said hub.

22. The crank assembly of claim 21, wherein said at least two spokes are articulated and each include at least one hinged joint.

23. A cycle crank assembly comprising:

a central hub having at least two spokes, said at least two spokes being articulated and including at least one hinged joint;

a chain ring having at least one sprocket associated therewith, said chain ring being moveably attached to said spokes using a slidable pin and slot arrangement such that said chain ring and sprocket are laterally moveable with respect to said hub.

24. The crank assembly of claim 23, wherein said at least two spokes are articulated and each include at least one hinged joint.

* * * * *